US011962110B2

(12) United States Patent
Spincich et al.

(10) Patent No.: US 11,962,110 B2
(45) Date of Patent: Apr. 16, 2024

(54) HOUSING ASSEMBLY FOR AN ELECTRICAL CONNECTOR

(71) Applicant: TE Connectivity Italia Distribution S.r.l., Turin (IT)

(72) Inventors: Demis Spincich, Turin (IT); Alessandro Genta, Turin (IT); Stanislas Di Maggio, Turin (IT)

(73) Assignee: TE Connectivity Italia Distribution S.r.l., Turin (IT)

( * ) Notice: Subject to any disclaimer, the term of this patent is extended or adjusted under 35 U.S.C. 154(b) by 38 days.

(21) Appl. No.: 17/479,048

(22) Filed: Sep. 20, 2021

(65) Prior Publication Data

US 2022/0102901 A1 Mar. 31, 2022

(30) Foreign Application Priority Data

Sep. 25, 2020 (IT) ........................ 102020000022711

(51) Int. Cl.
*H01R 13/506* (2006.01)

(52) U.S. Cl.
CPC .................................. *H01R 13/506* (2013.01)

(58) Field of Classification Search
CPC ............ H01R 13/506; H01R 13/62922; H01R 13/62933; H01R 13/62944; H01R 13/62977
See application file for complete search history.

(56) References Cited

U.S. PATENT DOCUMENTS 5,489,224 A * 2/1996 Schwarz .......... H01R 13/62977 439/752
5,597,315 A * 1/1997 Taguchi ........... H01R 13/62972 439/157
5,928,012 A * 7/1999 Kitamura ......... H01R 13/62977 439/157
6,168,445 B1 1/2001 Seutschniker et al.
6,824,405 B2 * 11/2004 Hubbard .......... H01R 13/62933 439/465
7,695,296 B1 4/2010 Hitchcock et al.
8,632,349 B2 * 1/2014 Genta .............. H01R 13/62977 439/157
2005/0186811 A1 8/2005 Lee et al.
2008/0214039 A1 * 9/2008 Ciriello ............ H01R 13/62977 439/347
2016/0149342 A1 5/2016 Rodriguez

FOREIGN PATENT DOCUMENTS

DE 10 2013 222 533 A1 5/2014

OTHER PUBLICATIONS

Italian Search Report, No. IT 202000022711, dated May 26, 2021, 9 pages.
Abstract of DE 10 2013 222 533, dated May 28, 2014, 1 page.
European Search Report, Application No. 21198709.4-1201, dated: Jan. 26, 2022, 7 pages.

* cited by examiner

*Primary Examiner* — Oscar C Jimenez
(74) *Attorney, Agent, or Firm* — Barley Snyder

(57) ABSTRACT

A housing assembly for an electrical connector includes a base element having an opening, a cover for covering the opening, and a locking mechanism. The locking mechanism has a slidable member movable into a locking position in which the locking mechanism locks the cover relative to the base element. The locking mechanism has a transmission element for transmitting force and movement onto the locking mechanism.

13 Claims, 11 Drawing Sheets

HOUSING ASSEMBLY FOR AN ELECTRICAL CONNECTOR

CROSS-REFERENCE TO RELATED APPLICATIONS

This application claims the benefit of the filing date under 35 U.S.C. § 119(a)-(d) of Italian Patent Application No. 102020000022711, filed on Sep. 25, 2020.

FIELD OF THE INVENTION

The present invention relates to an electrical connector and, more particularly, to a housing assembly for an electrical connector.

BACKGROUND

A housing assembly of an electrical connector can have a cover lockable by a locking mechanism. Known locking mechanisms of this type are often difficult to operate as, for example, they require the insertion of an external tool into an interior of the housing assembly with high precision and a subsequent operation with relatively high forces.

SUMMARY

A housing assembly for an electrical connector includes a base element having an opening, a cover for covering the opening, and a locking mechanism. The locking mechanism has a slidable member movable into a locking position in which the locking mechanism locks the cover relative to the base element. The locking mechanism has a transmission element for transmitting force and movement onto the locking mechanism.

BRIEF DESCRIPTION OF THE DRAWINGS

The invention will now be described by way of example with reference to the accompanying Figures, of which.

DETAILED DESCRIPTION OF THE EMBODIMENTS

The invention will now be described in greater detail and in an exemplary manner using embodiments and with reference to the drawings. The described embodiments are only possible configurations in which, however, the individual features as described herein can be provided independently of one another or can be omitted.

FIGS. 1 to 15 show an embodiment of a housing assembly 100 for an electrical connector. The housing assembly 100 comprises a base element 20 that can house, for example, connection elements that allow making a connection to a further element, for example a mating connector. The base element 20 has an opening 21 through which an interior cavity of the base element 20 is accessible. The opening 21 has a basically planar structure and defines a plane 22 of the opening 21, as shown in FIG. 1.

Figure 1:
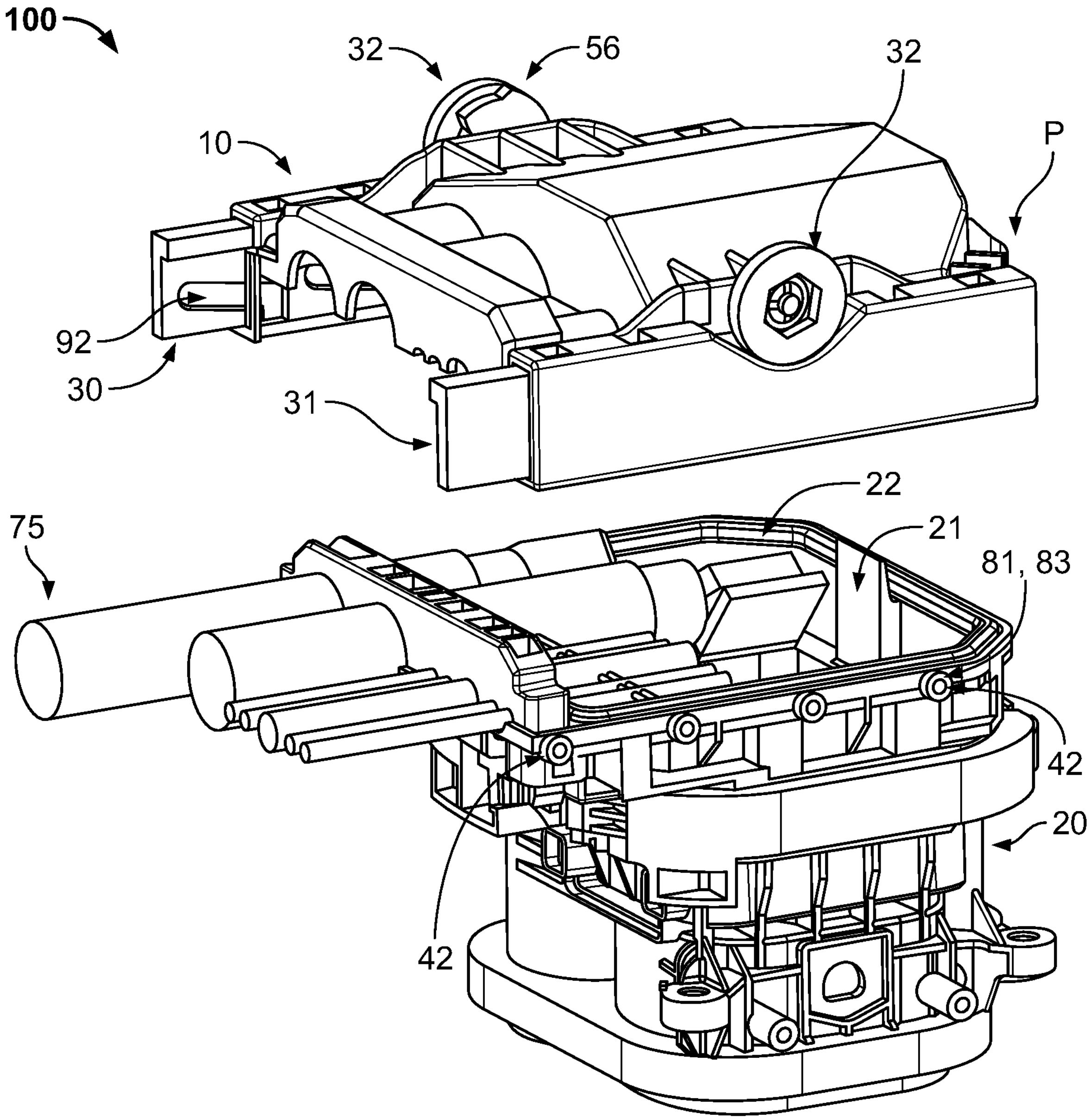
FIG. 1 is an exploded perspective view of a housing assembly according to an embodiment in a pre-mounting position.

For closing or covering the opening 21, the housing assembly 100 comprises a cover 10 that fits on the opening 21, as shown in FIG. 1. In order to lock the cover 10 onto and relative to the base element 20, the housing assembly 100 comprises two independent locking mechanisms 30. For the sake of simplicity, the principle of the locking mechanisms 30 is described referring to a single locking mechanism 30 only.

The locking mechanism 30 comprises a slidable member 31. The slidable member 31 can be brought into a locking position L in which the cover 10 is locked to the base element 20, shown in FIG. 3, by the locking mechanism 30. When the slidable member 31 is outside the locking position L, for example in an unlocked position U, the cover 10 is not necessarily locked to the base element 20 by the locking mechanism 30. If no other locking devices are present, the cover 10 can then be removed or separated from the base element 20.

Figure 2:
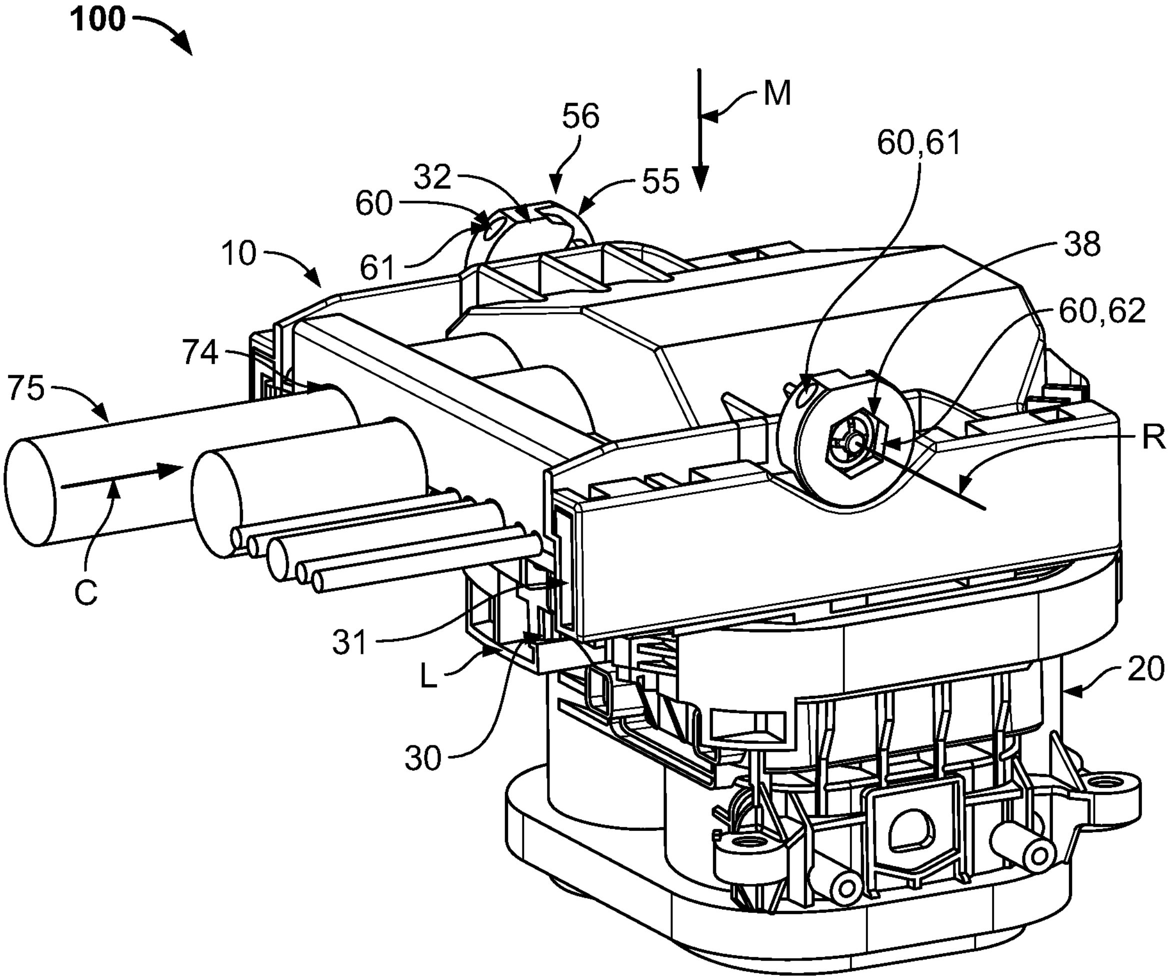
FIG. 2 is a perspective view of the housing assembly of FIG. 1 in an assembled state.
Figure 9:
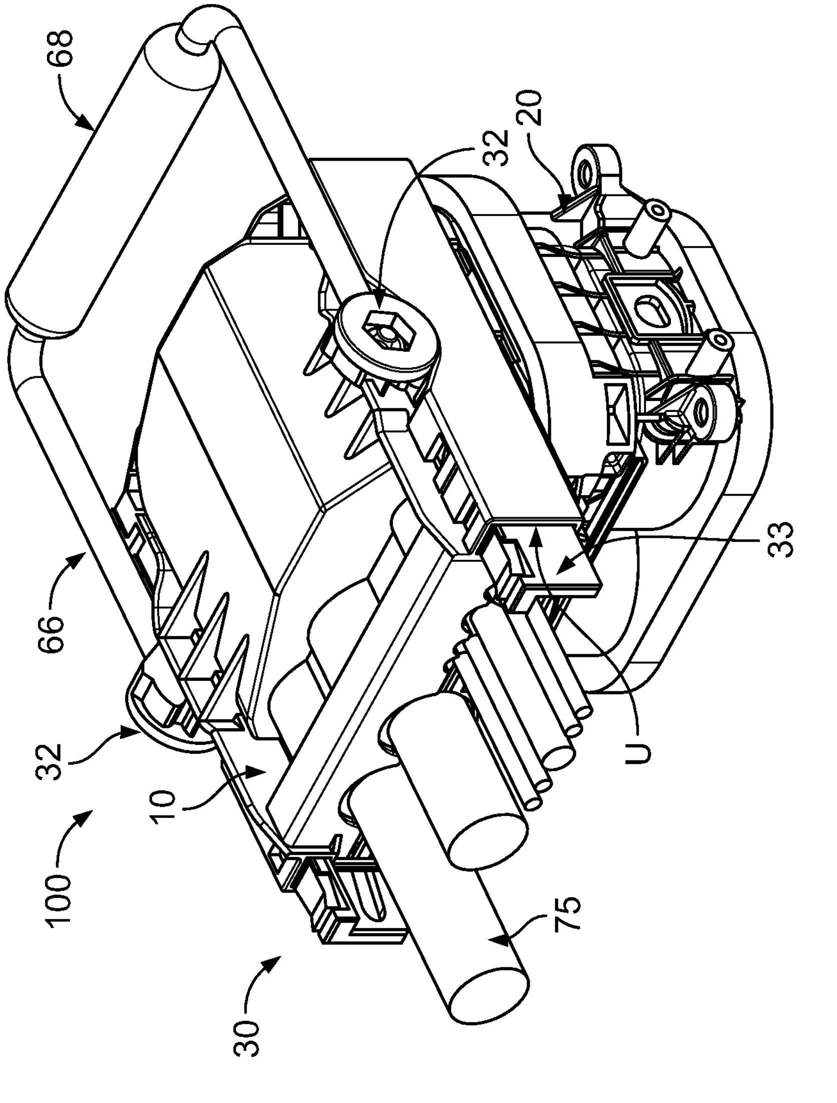
FIG. 9 is a perspective view of the housing assembly of FIG. 8 with the external tool inserted into a transmission element.

The slidable member 31 can be brought into the locking position L by moving along a linear path 33, shown in FIG. 9. The linear path 33 is parallel to the plane 22 of the opening 21 and perpendicular to a mounting direction M along which the cover 10 is mounted onto the base element 20. The linear path 33 is further perpendicular to a plugging direction along which the connector can be plugged into a mating connector. The plugging direction can be parallel to the mounting direction M. Further, the linear path 33 is parallel to a cable direction C along which a cable 75 enters through an inlet 74 for the cable 75, as shown in FIG. 2. The inlet 74 is thus formed by the cover 10 and the base element 20 in the assembled state.

In order to transmit force and movement onto the locking mechanism 30 and in particular the slidable member 31, the locking mechanism 30 comprises a transmission element 32. The transmission element 32 is embodied as a toothed gear wheel 55, in particular as an only partially toothed gear wheel 56, as shown in FIG. 2. Such a transmission element 32 can be easier to produce than a fully toothed gear wheel and/or provide a higher stability.

Figure 6:
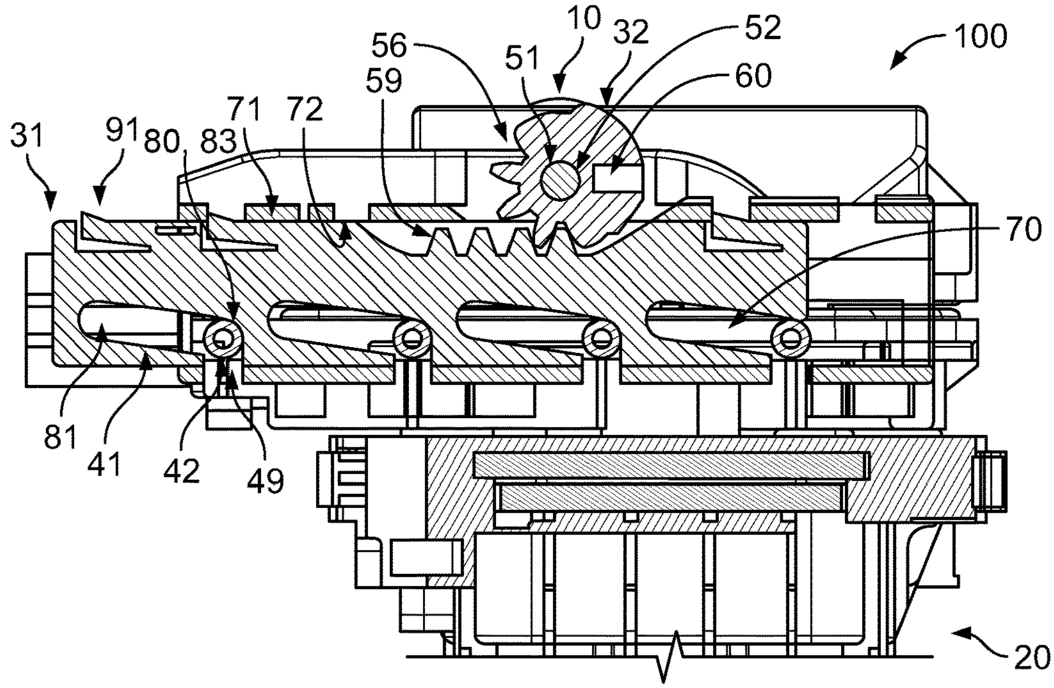
FIG. 6 is a sectional side view of the housing assembly in an unlocked position of a slidable member.
Figure 10:
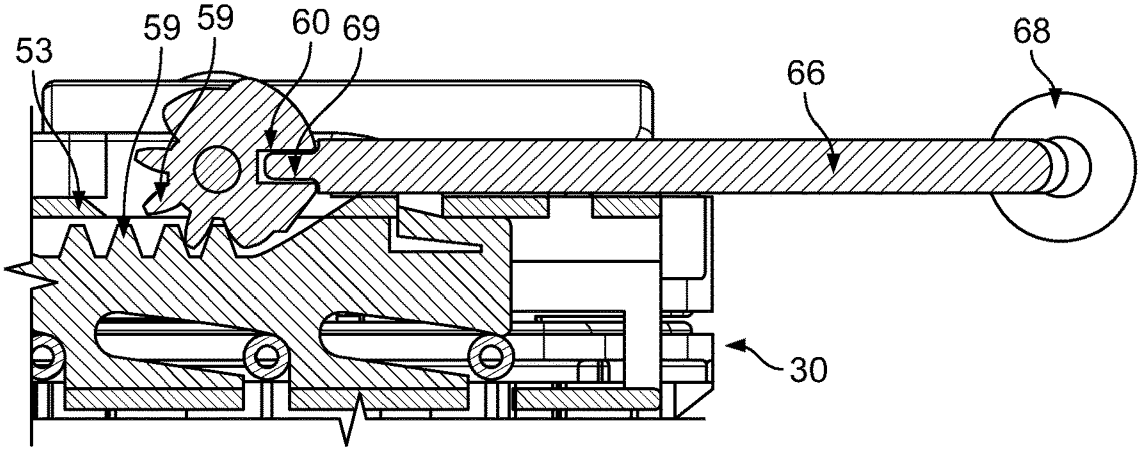
FIG. 10 is a sectional side view of the housing assembly of FIG. 9.

The transmission element 32 is a separate part that is, for example, not unitary or monolithic with the slidable member 31; this can make an easy exchange possible, for example if characteristics of the transmission element 32 are to be changed or in case of wear and tear on the transmission element 32. Teeth 59 of the transmission element 32 engage corresponding teeth 59 on a toothed section 53 on the slidable member 31 to allow for good force and motion transfer, as shown in FIGS. 6 and 10. The teeth 59 can engage each other at least in an assembled state. When the transmission element 32 rotates, the slidable member 31 moves along the linear path 33 and can be brought into and out of the locking position L.

In the present embodiment, the slidable member 31 and the transmission element 32 are arranged on the cover 10. In other embodiments, the slidable member 31 and the transmission element 32 could also be located on the base element 20. The slidable member 31 is held slidably or movably on the cover 10 with guiding elements 71 on the cover 10 and guiding elements 72 on the slidable member 31, shown in FIGS. 3 and 4. The guiding elements 71, 72 can be guiding faces. The guiding elements 71, 72 can at least partially surround the slidable member 31 to hold the slidable member 31 on the cover 10.

In an alternative embodiment, the slidable member 31 can be guided on the base element 20. Therefore, the base element 20 and/or the slidable member 31 can comprise guiding elements for sliding the slidable member 31 on the base element 20. The guiding elements can at least partially surround the slidable member 31 to hold the slidable member 31 on the base element 20.

The transmission element 32 is borne rotatably on the cover 10 for well-defined motion. To allow such a rotation, the cover 10 has a rotational bearing face 51 and the transmission element 32 has a further rotational bearing face 52 that engages the rotational bearing faces 51 of the cover 10, as shown in FIG. 6. The two rotational bearing faces 51, 52 have a circular cylindrical shell shape with approximately the same diameter to allow the rotation of the transmission element 32 about a rotation axis R. Other rotational bearing systems comprising further bearing elements like balls or cylinders can also be used.

In order to allow a locking, the housing assembly 100 comprises several first engagement faces 41 on the slidable member 31 and several second engagement faces 42 on the element to which a connection is to be made (in this case the base element 20, alternatively the cover 10), as shown in FIG. 6. The first engagement face 41 and the second engagement face 42 move relative to each other when the slidable member 31 is brought into the locking position L. In the locking position L, the first and second engagement face 41, 42 can engage or abut each other. At least in one position outside the locking position L, for example an unlocked position U, the first and second engagement face 41, 42 do not have to engage or abut each other. They can rather be movable relative to each other.

In the shown embodiment, the first engagement faces 41 are sidewalls of a recess 81 in the slidable member 31, allowing for a compact configuration. The second engagement faces 42 are located on a protrusion 80 in the form of pins 83 protruding from the side of the base element 20, which can result in a defined force transfer. The recesses 81 further comprise insertion openings 49 that allow the insertion of the protrusions 80 during the mounting process and the exiting of the protrusions 80 from the recesses 81 in the unlocked positon U, enabling a separation of the slidable member 31 from the base element 20. In an embodiment, at least one of the engagement daces 41 and at least one of the second engagement faces 42 can be located in a cutout, which can facilitate an easy inspection and/or cleaning.

Figure 12:
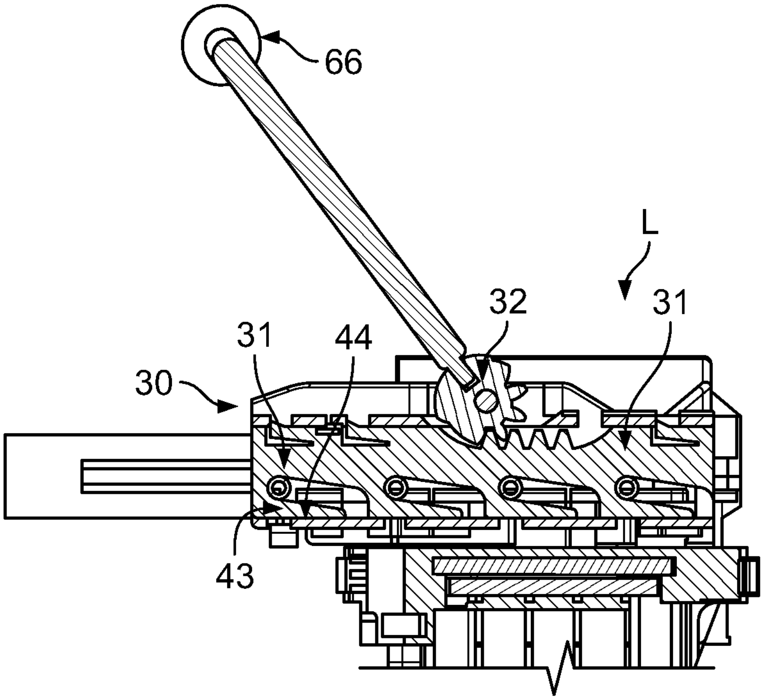
FIG. 12 is a sectional side view of the housing assembly of FIG. 11.

Third engagement faces 43 on the slidable member 31 that engage fourth engagement faces 44 on the cover 10, as shown in FIG. 12, allow a force flow from the slidable member 31 to the cover 10 and in combination with the first and second engagement faces 41, 42 a force flow from the cover 10 to the base element 20 via the slidable member 31. The at least one third and the at least one fourth engagement face 43, 44 can be in permanent engagement, in particular independent of the position of the slidable member 31.

The first engagement faces 41 are inclined or oblique relative to a mounting direction M along which the cover 10 is mounted to the base element 20, as shown in FIG. 6. The locking mechanism 30 thus also acts as a pressing mechanism 70 that automatically presses the cover 10 onto the base element 20 when the slidable member 31 is brought into the locking position L. This can, in particular, happen automatically when the slidable member 31 is moved into the locking position L.

Figure 5:
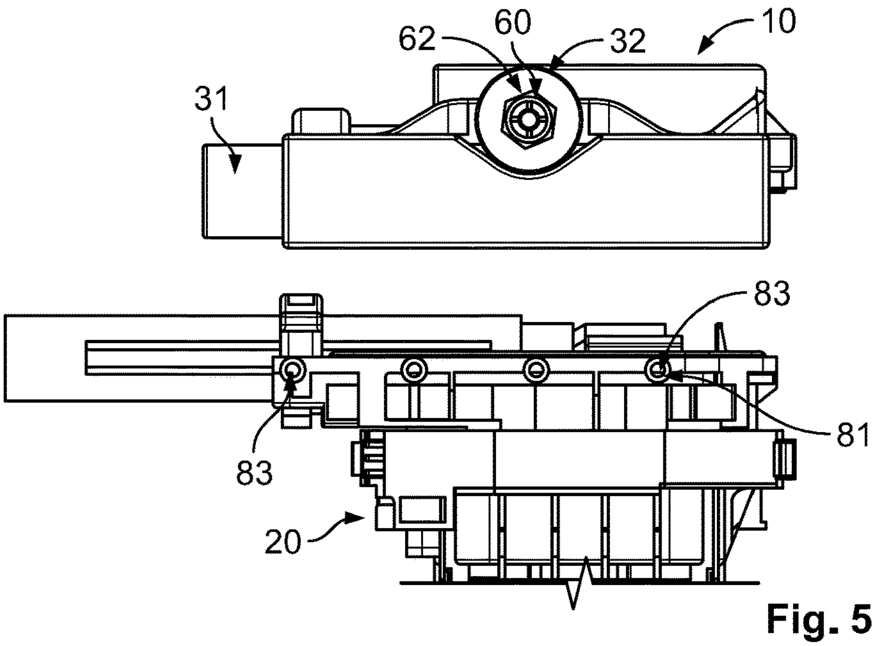
FIG. 5 is a side view of the housing assembly in the pre-mounting position.

Each of the transmission elements 32 comprises two tool interfaces 60 that are adapted for applying force and movement onto the transmission element 32 with an external tool, as shown in FIGS. 2, 5, and 6.

Figure 8:
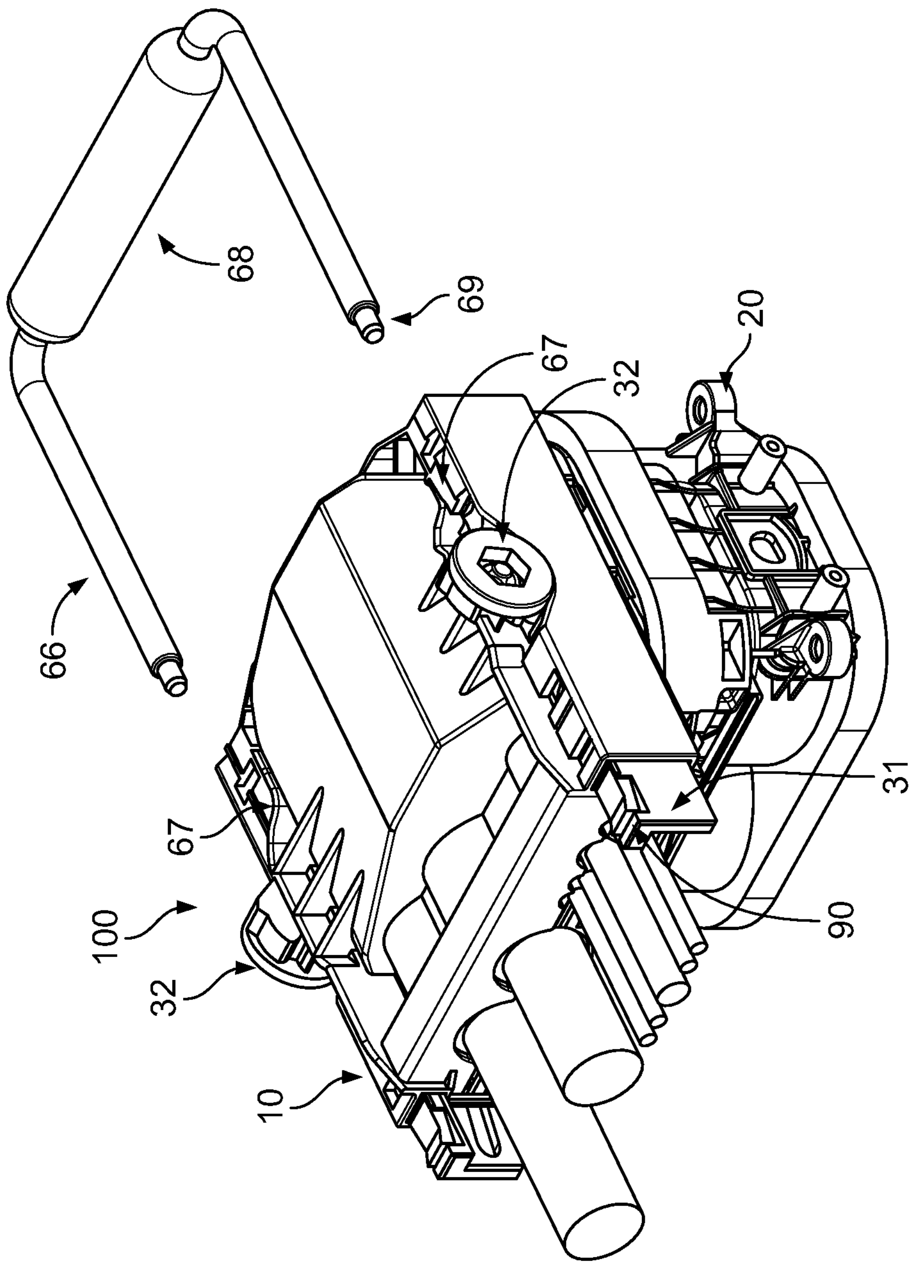
FIG. 8 is a perspective view of the housing assembly in an unlocked position of the slidable member with an external tool.

A first tool interface 60 is an elongated hole 61 that is accessible perpendicular to the rotation axis R for an external tool 66 having a basically cylindrical engagement section 69, as shown in FIG. 10. This external tool 66 can be used for manual operation, for example in the field on the finished product. For guiding the external tool 66, guiding sections 67 shown in FIG. 8 are present on the cover 10 that guide the engagement section 69 of the external tool 66 into the tool interface 60. The elongated hole 61 allows the insertion of the elongated tool 66 along a sufficient engagement length to allow a safe operation.

Figure 3:
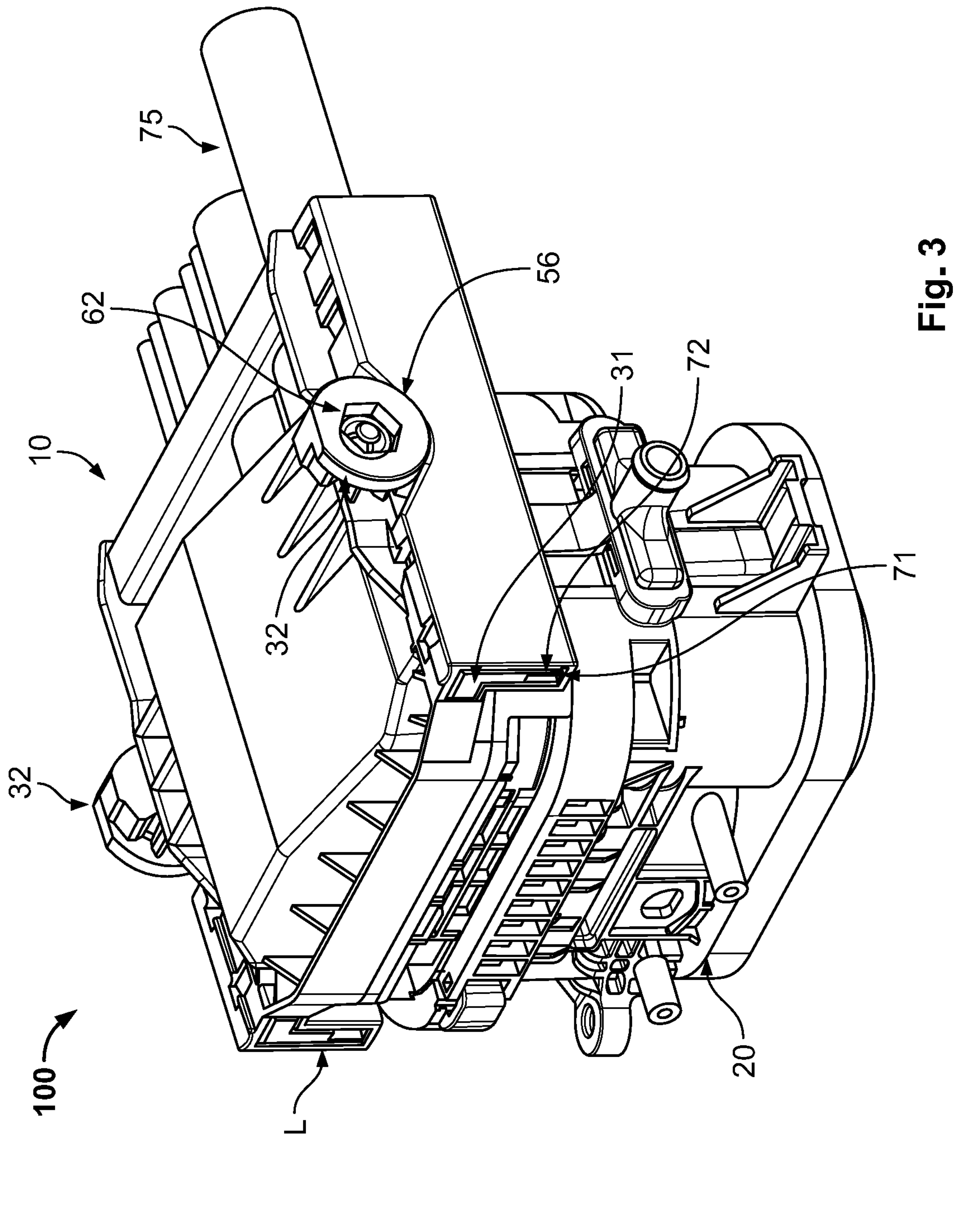
FIG. 3 is another perspective view of the housing assembly of FIG. 1.
Figure 4:
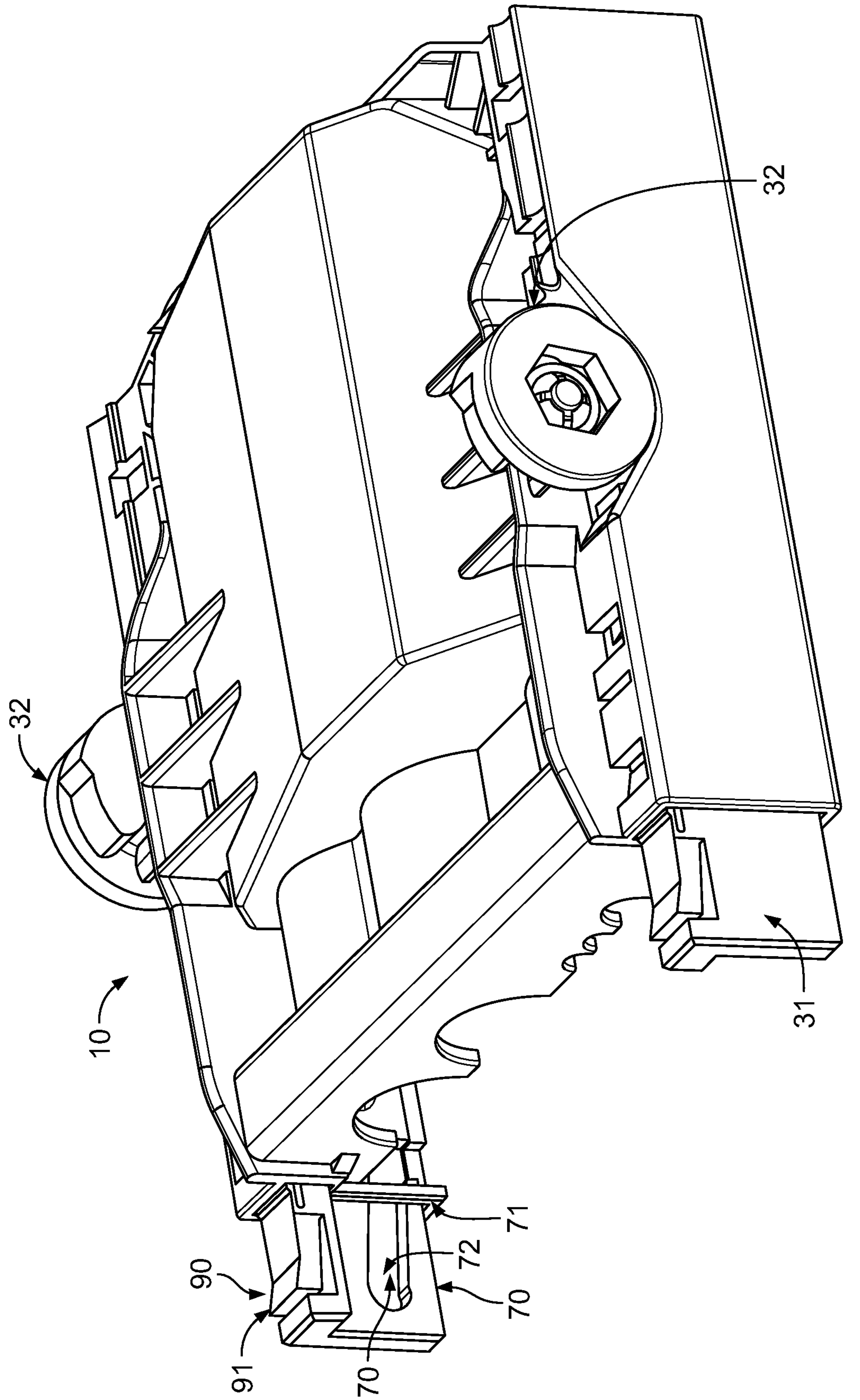
FIG. 4 is a perspective view of a cover with a locking mechanism.

A second tool interface 60 has a hex key interface 62, as shown in FIGS. 2 and 3, and is accessible along the rotation axis R. This second tool interface 60 can be used during manufacture of the housing assembly 100 for example in a production facility with a hexagonal, non-shown external tool.

In an embodiment, both tool interfaces 60 are accessible from outside. In a further embodiment, at least one tool interface 60 can be embodied as a slit for a screwdriver or other tools with a flat front.

A space saving operation of the transmission element 32 can be achieved in that at least one tool interface 60 can be accessible parallel to a rotation axis of the transmission element 32. In a further embodiment, at least one tool interface 60 can be accessible perpendicular to a rotation axis of the transmission element 32. This can, for example, allow for the application of higher forces if longer levers are used.

The external tool 66 can be used to apply force and movement only when needed and be removed afterwards. Thus, the resulting housing assembly 100 is more compact and more lightweight than when an element for applying force and movement is permanently attached to the housing assembly 100. The tool interface 60 can be such that it is impossible or difficult to operate the transmission element 32 without a specific tool. The tool interface 60 can have a shape that only allows the insertion of the specific tool.

In an embodiment, the transmission element 32 can have one tool interface for an automatic operation, for example during manufacture, and a second tool interface for manual operation, for example for operation in the field when production is finished and the housing assembly 100 is in use.

Figure 11:
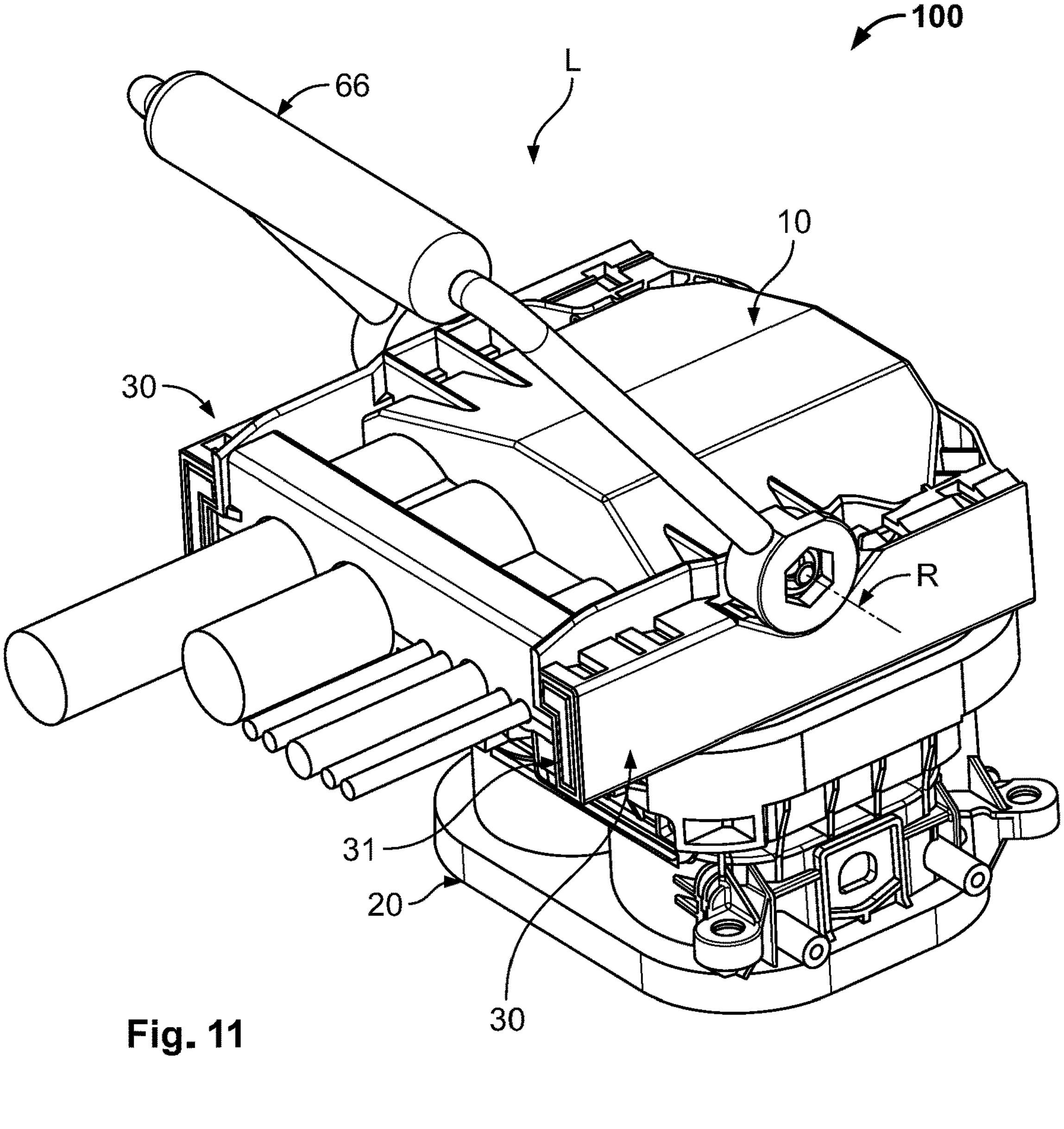
FIG. 11 is a perspective view of the housing assembly with the external tool in a rotated position and the slidable member in a locking position.

A mating and locking sequence can be seen in FIGS. 1 and 8 to 14. In FIG. 1, a pre-mounting position P is shown in which the cover 10 is still separate from the base element 20. The cover is then moved along a mating direction M onto the base element 20. Then, for example, an external tool 66 shown in FIGS. 8-10 is brought into engagement with the transmission elements 32. The external tool 66 can then be swiveled about the rotation axis R by applying force and movement at an actuation section 68 of the external tool 66, as shown in FIGS. 11 and 12. With this actuation, the slidable member 31 is brought into the locking position L and the cover 10 is locked relative to the base element 20. The transmission element 32 transmits force and movement onto the locking mechanism 30. Such a transmission element 32 can be more easily accessible, require less precision and allow the operation with lower forces due a leverage effect.

Figure 14:
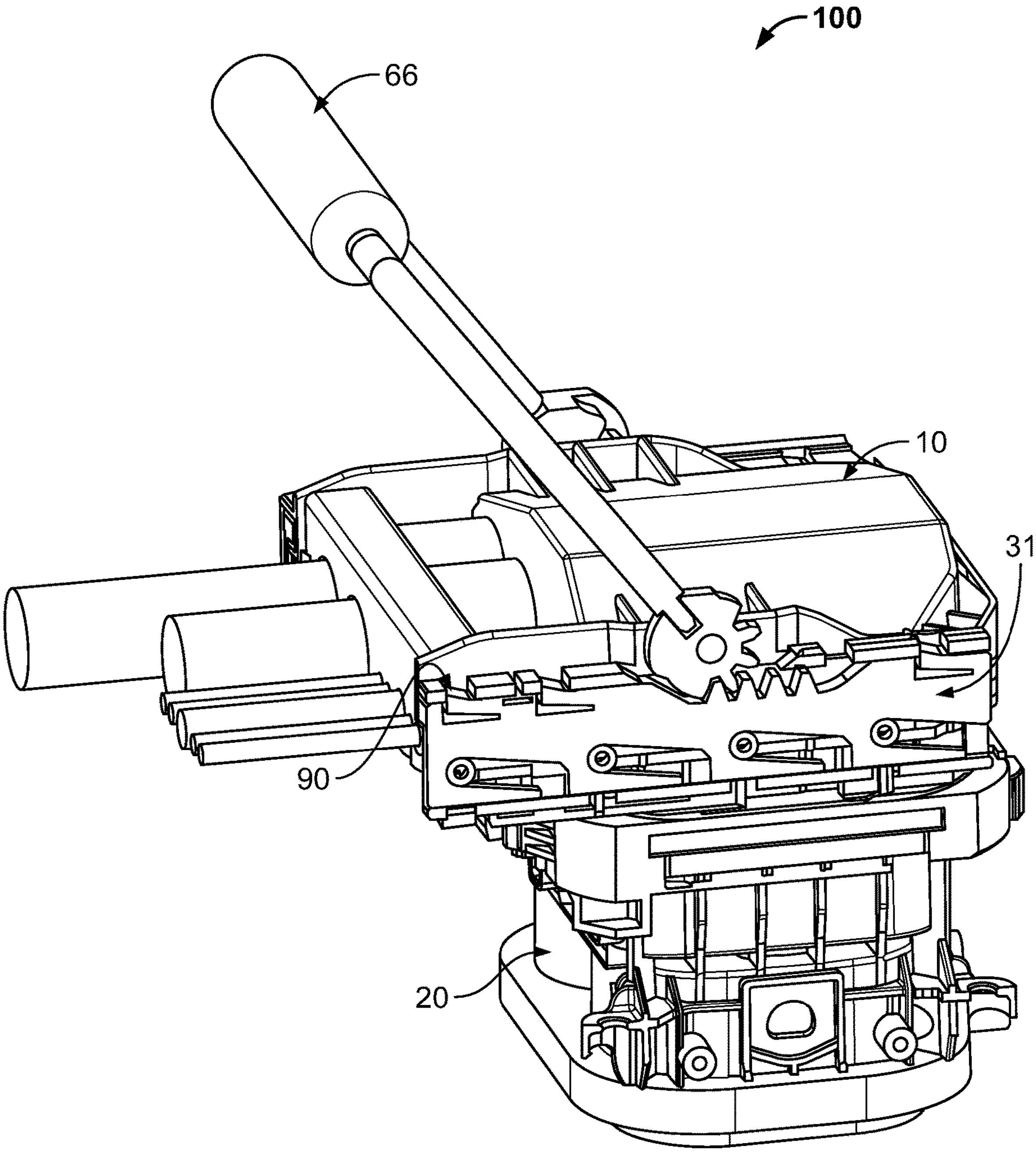
FIG. 14 is a sectional perspective view of the housing assembly in the locking position of the slidable member.
Figure 15:
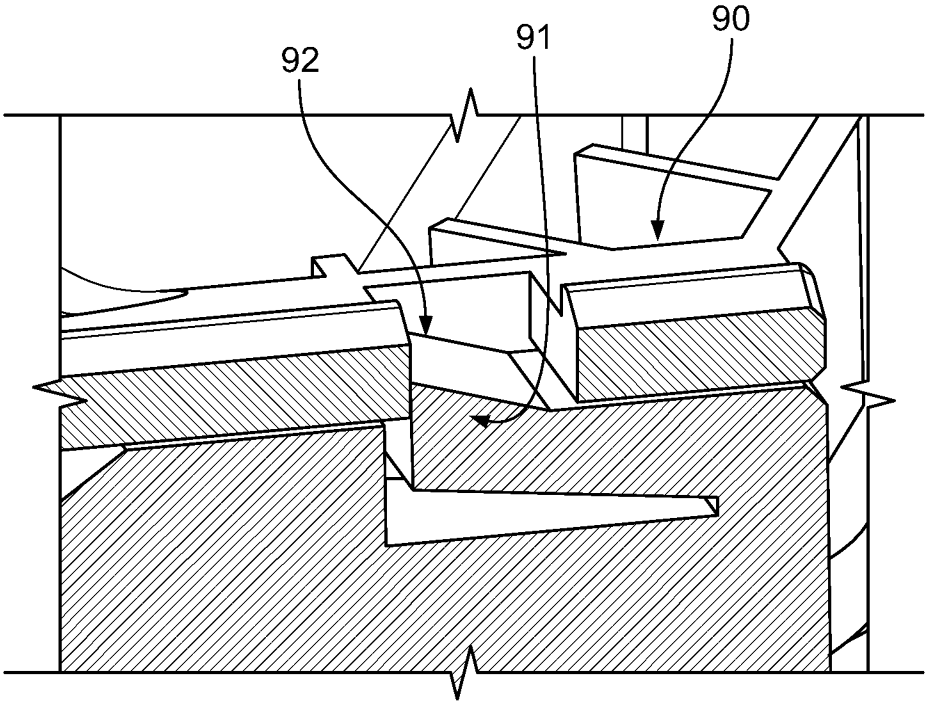
FIG. 15 is a sectional perspective view of a securing mechanism.

When reaching the locking position L, a securing mechanism 90 automatically becomes operative and secures the slidable member 31 relative to the cover 10, as shown in FIG. 14. The securing mechanism 90 comprises a latch 91 on the slidable member 31 and a corresponding recess 92 on the cover 10 that automatically engage each other when the locking position L is reached, as shown in FIG. 15. This engagement can, for example, be unmated manually by pressing down on the latch 91.

In other embodiments, the housing assembly 100 can comprise protrusions for engaging with the latches 91. In an embodiment, the recesses 92 or protrusions are located on the element on which the slidable member 31 is mounted slidably, for example the cover 10 or the base element 20. This allows a particularly safe operation. In an alternative embodiment, the corresponding counter elements can be located on a different element.

Figure 7:
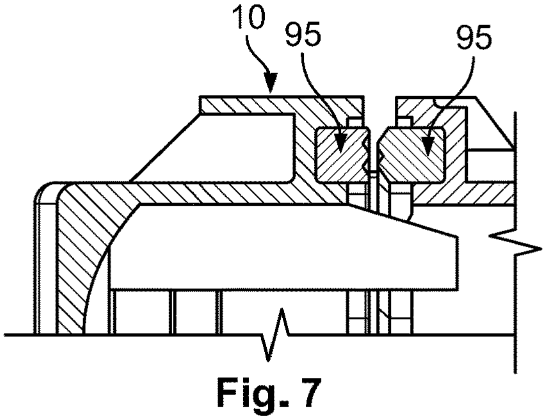
FIG. 7 is a detail sectional view of a sealing mechanism.
Figure 13:
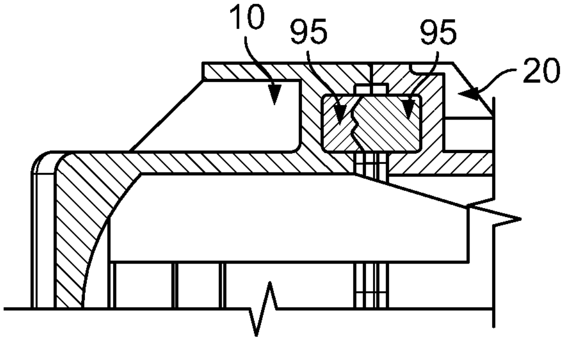
FIG. 13 is a detail sectional side view of a sealing mechanism.

Further, as can be seen in FIGS. 7 and 13, sealing elements 95 on the cover 10 and the base element 20 are pressed against each other due to the pressing mechanism 70, resulting in a sealing of the interior of the housing assembly 100 when the locking position L is reached.

The housing assembly 100 comprises two locking mechanisms 30 each with one transmission element 32. The two locking mechanisms 30 can be operated separately and independently. This is an additional safety feature as an unintentional unlocking can thus be avoided.

Further, the cover 10 is locked relative to the base element 20 only by the locking mechanism 30. No further locking devices, in particular no screws, are necessary for the locking.

What is claimed is:

1. A housing assembly for an electrical connector, comprising:

a base element having an opening;

a cover for covering the opening; and a locking mechanism having a slidable member movable into a locking position in which the locking mechanism locks the cover relative to the base element, the locking mechanism has a transmission element for transmitting force and movement onto the locking mechanism, the transmission element has a first tool interface with an elongated hole complementary to a first external tool and a second tool interface with a recessed shape complementary to a second external tool, the first tool interface and the second tool interface respectively receive the first external tool and the second external tool for applying force and movement onto the transmission element, the second tool interface is accessible parallel to a rotation axis of the transmission element.

2. The housing assembly of claim 1, further comprising a first engagement face on the slidable member and a second engagement face on the cover or the base element, the first engagement face and the second engagement face move relative to each other when the slidable member is brought into the locking position.

3. The housing assembly of claim 1, wherein the transmission element is a separate part from the slidable member.

4. The housing assembly of claim 1, wherein the transmission element and the slidable member are toothed.

5. The housing assembly of claim 1, wherein the transmission element is an only partially toothed gear wheel.

6. The housing assembly of claim 1, wherein the transmission element is held rotatably on the cover or the base element.

7. The housing assembly of claim 1, wherein the first tool interface is accessible perpendicular to the rotation axis of the transmission element.

8. The housing assembly of claim 1, further comprising an inlet for a cable.

9. The housing assembly of claim 1, wherein the slidable member is guided on the cover.

10. The housing assembly of claim 1, further comprising a securing mechanism securing the slidable member in the locking position.

11. The housing assembly of claim 10, wherein the securing mechanism has a latch.

12. The housing assembly of claim 11, wherein the latch is on the slidable member.

13. The housing assembly of claim 1, wherein the locking mechanism is one of a pair of locking mechanisms.

* * * * *